United States Patent
Miura

[11] Patent Number: 5,855,045
[45] Date of Patent: Jan. 5, 1999

[54] RATCHET BUCKLE ASSEMBLY

[75] Inventor: Yuichi Miura, Tokyo, Japan

[73] Assignee: Takigen Manufacturing Co. Ltd., Tokyo, Japan

[21] Appl. No.: 541

[22] Filed: Dec. 30, 1997

[30] Foreign Application Priority Data

Mar. 12, 1997 [JP] Japan ................................. 9-076572

[51] Int. Cl.⁶ .............................................. B25B 25/00
[52] U.S. Cl. ........................................ 24/68 CD; 24/68 R
[58] Field of Search .......................... 24/68 CD, 68 R, 24/68 B, 68 D, 68 SK, 68 BT, 170, 191, 193, 270

[56] References Cited

U.S. PATENT DOCUMENTS

| | | | |
|---|---|---|---|
| 4,185,360 | 1/1980 | Prete, Jr. et al. | 24/68 CD |
| 4,199,182 | 4/1980 | Sunesson | 24/68 CD |
| 4,542,883 | 9/1985 | Rutzki | 24/68 CD |
| 5,103,536 | 4/1992 | Kamper | 24/68 R |
| 5,426,826 | 6/1995 | Takimoto | 24/68 CD |

FOREIGN PATENT DOCUMENTS

| | | | |
|---|---|---|---|
| 6-284912 | 6/1994 | Japan . | |
| 1342218 | 1/1974 | United Kingdom | 24/68 CD |

*Primary Examiner*—Victor N. Sakran
*Attorney, Agent, or Firm*—Martin Smolowitz

[57] ABSTRACT

A assembly is improved in rigidity to sufficiently bear the stress imposed thereon under a tensile force exerted by a strap 27. In the assembly, the strap winding shaft 7 is constructed of a pair of the main-shaft segments 7a, 7b and a core plate segment 8; and, the strap 27 has its first one 27a of its opposite end portions 27a, 27b inserted into both the first slots 24 (which extends the radial direction of the main-shaft segments 7a, 7b) and the second slot 25 (which extends in the thickness direction of the core plate segment 8), and the strap is wound on the strap winding shaft 7.

7 Claims, 4 Drawing Sheets

RATCHET BUCKLE ASSEMBLY

BACKGROUND OF THE INVENTION

1. Field of the Invention

The present invention relates to a ratchet buckle assembly for tightening a strap for binding a load safely in a desired position in safety, in trucks, cargo-handling installations and the like.

2. Description of the Prior Art

As disclosed in Japanese Patent Laid-Open No. Hei 6-284912, it is well known to construct a ratchet buckle assembly for tightening a binding strap, in a manner such that: a pair of ratchet wheels are fixedly mounted on a strap winding shaft; this strap winding shaft is inserted in an axial hole of a base end portion of each of a main body and a handle; the handle is rotatably connected with the main body; the strap has one of its opposite end portions wound on the strap winding shaft and the other end portion fixed to a strap fixing bar of a front-end portion of the main body; a drive plate, which is slidably mounted in a guide hole, is urged forward toward the ratchet wheels by a compression spring. When the handle is rotated in a predetermined direction, such drive plate is engaged with any one of follower surfaces of teeth of the ratchet wheels, so that the strap winding shaft is rotated in its winding direction, in a condition in which a ratchet slips away along releasing surfaces of the teeth of the ratchet wheels. When the handle is reversed in rotation, the ratchet is engaged with the follower surface of a pair of the teeth of the ratchet wheels to prevent the strap winding shaft from rotating in the reverse direction; and, at the same time, the drive plate is permitted to slip away along the releasing surfaces of the teeth of the ratchet wheels.

In the above-mentioned conventional ratchet buckle assembly: the strap winding shaft is constructed of a tubular element provided with a slot extending in a radial direction of the tubular element; and, the strap has its end portion inserted in such slot, which enables the strap winding shaft to wind the strap thereon.

However, when the strap winding shaft is subjected to an excessively large stress caused by a large tensile force exerted by a random movement of a cargo fixed by the strap, the strap winding shaft is resiliently deformed. When the amount of such shaft deformation exceeds a predetermined limit, the strap winding shaft fails to wind the strap thereon.

SUMMARY OF THE INVENTION

Under such circumstances for the known ratchet buckle assembly, the present invention was made. Consequently, it is an object of the present invention to provide a ratchet buckle assembly for tightening a strap, in which the buckle assembly strap winding shaft is improved in rigidity sufficiently to bear the strain caused by a large tensile force exerted by the strap without deformation of the winding shaft.

According to a first aspect of the present invention, the above object of the present invention is accomplished by providing:

In a ratchet buckle assembly for tightening a strap, comprising:

a ratchet wheel;

a main body provided with a first axial hole in its base-end portion;

a handle provided with a second axial hole in its base-end portion, the handle being rotatably connected with the main body;

a strap winding shaft to which the ratchet wheel is fixedly mounted, the strap winding shaft being inserted in the first and the second axial hole of the base-end portions of both the main body and the handle;

a strap having a first one of its opposite end portions wound on the strap winding shaft, and the other, i.e., second one fixed to a strap fixing bar provided in a front-end portion of the main body;

a drive plate slidably mounted in a first guide hole of the handle, the drive plate being urged forward toward the ratchet wheel under the influence of a resilient force exerted by a first spring;

a ratchet slidably mounted in a second guide hole of the main body, the ratchet being urged forward toward the ratchet wheel under the influence of a resilient force exerted by a second spring;

whereby when the handle is rotated in a predetermined direction, the drive plate is engaged with one of follower surfaces of teeth of the ratchet wheel to rotate the strap winding shaft in its winding direction and, the ratchet is permitted to slip away along one of releasing surfaces of the teeth of the ratchet wheel; when the handle is reversed in its rotational direction, the ratchet is engaged with one of the follower surfaces of the teeth of the ratchet wheel to prevent the strap winding shaft from rotating in its reverse direction in a condition in which the drive plate is permitted to slip away along one of the releasing surfaces of the teeth of the ratchet wheel, the improvement wherein the strap winding shaft is constructed of:

a pair of main-shaft segments each having a semicircular cross section, the main-shaft segments being connected with each other at their opposite axial ends;

a core plate segment tightly fitted in a space defined between these main-shaft segments;

whereby the strap has the first one of its opposite end portions inserted in both a pair of first slots of the main-shaft segments and a second slot of the core plate segment, the first slots extending in a radial direction of the main-shaft segments, the second slot extending in the thickness direction of the core plate segment, and the strap is wound on the strap winding shaft.

DESCRIPTION OF THE PREFERRED EMBODIMENTS

Figure 1:
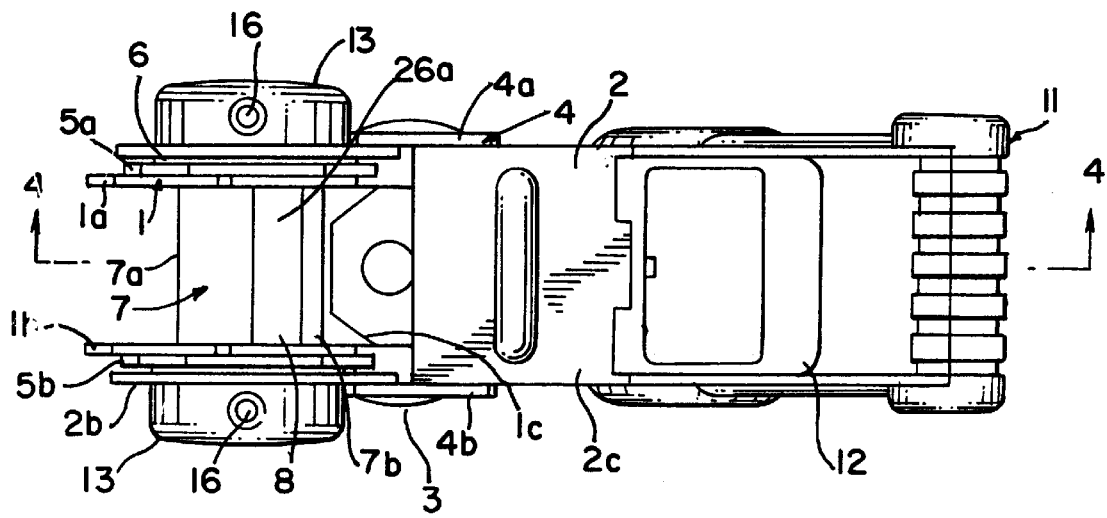
FIG. 1 is a plan view of an embodiment of the ratchet buckle assembly of the present invention.
Figure 2:
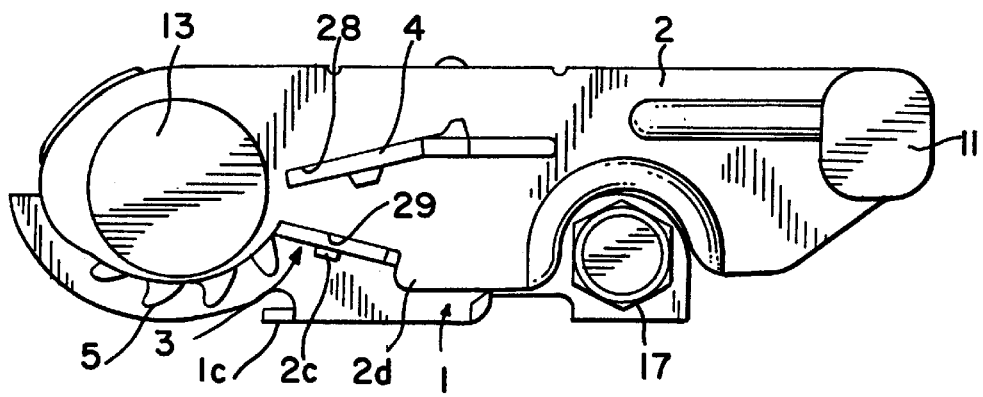
FIG. 2 is a front view of the ratchet buckle assembly of the present invention shown in FIG. 1.

Hereinbelow, the present invention will be described in detail with reference to the accompanying FIGS. 1–5 drawings and the reference numerals and characters.

A ratchet buckle assembly of the present invention for tightening an elongated strap, comprises: a ratchet wheel 5; a main body 1 provided with a first axial hole in its base-end portion; a handle 2 provided with a second axial hole in its base-end portion, the handle being rotatably connected with the main body; and, a strap winding shaft 7 to which the ratchet wheel 5 is fixedly mounted, the strap winding shaft being inserted in the first and the second axial holes of the base-end portions of both the main body 1 and the handle 2.

Further, the ratchet buckle assembly of the present invention comprises: a strap 27 having a first one end portion 27a of its opposite end portions 27a, 27b wound on the strap winding shaft 7, and the other, i.e., second one end portion 27b fixed to a strap fixing bar 17 provided in a front-end portion of the main body 1; a drive plate 4 slidably mounted in a first guide hole 28 of the handle 2, the drive plate 4 being urged forward toward the ratchet wheel 5 under the influence of a resilient force exerted by a first spring 15; and, a ratchet 3 slidably mounted in a second guide hole 29 of the main body 1. The ratchet 3 is urged forward toward the ratchet wheel 5 under the influence of a resilient force exerted by a second spring 14.

In the ratchet buckle assembly of the present invention having the above construction: when the handle 2 is rotated in a predetermined direction, the drive plate 4 is engaged with one of the frontal radial follower surfaces of teeth of the ratchet wheel 5 to rotate the strap winding shaft 7 in its winding direction; at the same time, the ratchet 3 is permitted to slip away along one of the angled rear releasing surfaces of the teeth of the ratchet wheel 5.

On the other hand, when the handle 2 is reversed in its rotational direction, the ratchet 3 is engaged with one of the radial follower surfaces of the teeth of the ratchet wheel 5 to prevent the strap winding shaft 7 from rotating in its reverse direction in a condition in which the drive plate 4 is permitted to slip away along one of the angled rear releasing surfaces of the teeth of the ratchet wheel 5.

The ratchet buckle assembly of the present invention having the above construction is improved in that the strap winding shaft 7 is constructed of: a pair of main-shaft segments 7a, 7b each having a semicircular cross section, the main-shaft segments 7a, 7b being connected with each other at their opposite axial ends; and, a core plate segment 8 tightly fitted in a space defined between these main-shaft segments 7a, 7b; wherein the strap has the first one 27a of its opposite end portions 27a, 27b inserted in both a pair of first slots 24 of the main-shaft segments 7a, 7b and a second slot 25 of the core plate segment 8. The first slots 24 extend in a radial direction of the main-shaft segments 7a, 7b, while the second slot 25 extends in the thickness direction of the core plate segment 8, which enables the strap 27 to be wound on the strap winding shaft 7.

In operation, the other end portion 27b of the strap 27 is wound on the strap fixing bar 17 and fixed thereto. After being wound on a cargo and the like, the strap 27 has its first end portion 27a inserted in the first slots 24 of the main-shaft segments 7a, 7b and the second slot 25 of the core plate segment 8. After that, the strap 27 is tightened manually by a user, so that the strap 27 is drawn from these slots 24, 25 to the full extent of the user's manual power.

Figure 3:
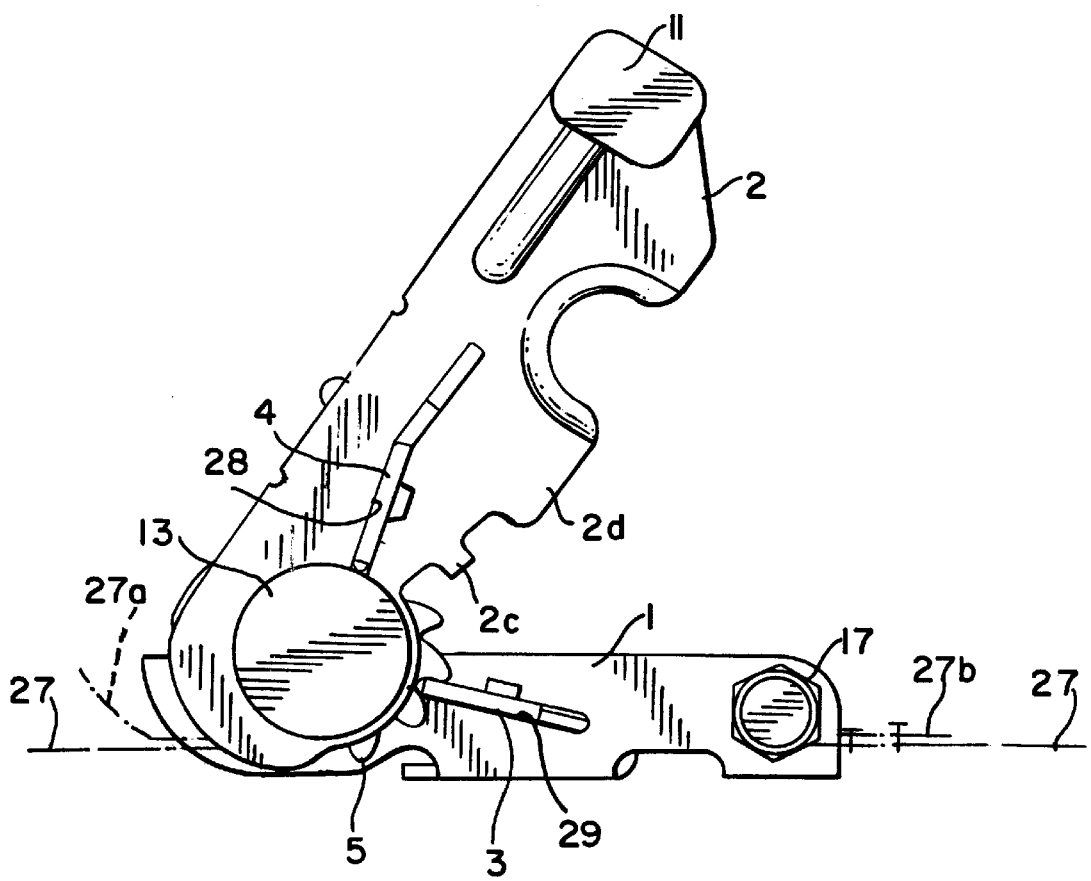
FIG. 3 is a front view of the ratchet buckle assembly of the present invention shown in FIG. 1, illustrating a rotational motion of the handle used in the assembly.
Figure 4:
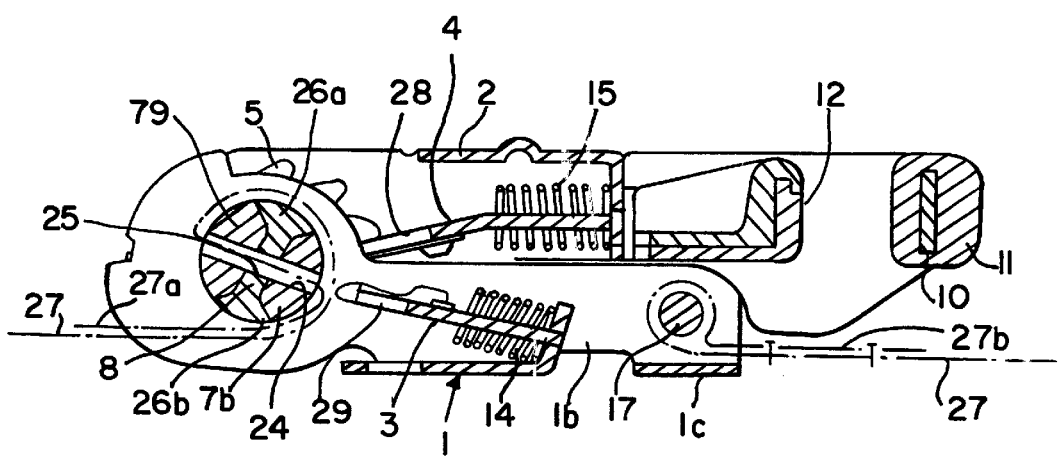
FIG. 4 is a longitudinal sectional view of the ratchet buckle assembly of the present invention, taken along the line 4—4 of FIG. 1.

After that, tightening operation of the strap 27 is conducted by rotating the handle 2. As shown in FIG. 3, when the handles 3 is pulled upward, the radial follower surface of each of the teeth of the ratchet wheel 5 is pushed forward by means of the drive plate 4. As a result, the strap winding shaft 7, which is integrally constructed with the ratchet wheel 5, is rotatably driven relative to both the main body 1 and the handle 2, which enables the strap winding shaft 7 to wind the strap 27 thereon by a predetermined length of the strap 27 incrementally at a time. At this time, in the forward rotation, the ratchet 3 slips away along the angle rear releasing surfaces of the teeth of the ratchet wheel 5.

When the handle 2 is rotated in its reverse direction and pushed down in the same direction, the ratchet 3 engages with one of the radial follower surfaces of the teeth of the ratchet wheel 5 to prevent the strap winding shaft 7 to rotate in the reverse direction, so that the current wound condition of the strap 27 of the strap winding shaft 7 is retained. At this time, the drive plate 4 slips away along the angled rear releasing surfaces of the teeth of the ratchet wheel 5. When the handle 2 is pushed down to reach its lowest position, the ratchet 3 engages successively with another one of the follower surfaces of the teeth of the ratchet wheel 5.

Under such circumstances, when the handle 2 is pulled up again in its rotation, the strap winding shaft 7 is rotatably driven through a predetermined amount of angle in its winding direction, so that the strap 27 is gradually or intermittently wound on the strap winding shaft 7, step by step. As a result, the strap 27 is tightened to fixedly mount the cargo and the like on a desired place.

In the above embodiment of the present invention, the main body 1 is constructed of: a pair of parallel-extending body arms 1a, 1b; and, a first connecting plate 1c for connecting these body arms 1a, 1b with each other in their bottom portions. The strap fixing bar 17 is fixedly mounted between these two body arms 1a, 1b.

On the other hand, the handle 2 is constructed of: a pair of parallel-extending handle arms 2a, 2b; and, a second connecting plate 2c for connecting these handle arms 2a, 2b with each other in their upper portions. Fixedly mounted on the second connecting plate 2c is a plastic grip 11. The main body 1 is housed in the interior space of the handle 2. On the other hand, a pair of the ratchet wheels 5a, 5b are housed in a space defined by both the body arms 1a, 1b and the handle arms 2a, 2b. The first guide hole 28 of the drive plate 4 is formed in each of the handle arms 2a, 2b.

On the other hand, the second guide hole 29 of the ratchet 3 is formed in each of the body arms 1a, 1b. Each of the first spring 15 and the second spring 14 is constructed of a compression coil spring.

Formed in a central area of the ratchet wheel 5 is a pair of through-holes 22a, 22b each having a substantially semi-circular shape. Tightly mounted in these through-holes 22a, 22b are the main-shaft segments 7a, 7b of the strap winding shaft 7. The ratchet wheel 5 is fixedly mounted on the strap winding shaft 7 and prevented from rotating relative to the shaft 7.

A pair of axial end caps 13 are provided with a pair of concave portions 23a, 23b each assuming a substantially semicircular shape. Tightly mounted in these concave portions 23a, 23b of each end cap 13 are both the end portions of the main-shaft segments 7a, 7b of the strap winding shaft 7. A first receiving hole 18 is formed in a terminal portion of each of the main-shaft segments 7a, 7b. On the other hand, each of the axial end caps 13 is provided with a second receiving hole 21. Driven in and fixedly mounted in both the first receiving hole 18 and the second receiving hole 21 is a lock pin 16 which may retain the axial end caps 13 on the main-shaft segments 7a, 7b in a manner such that these axial end caps 13 do not drop out of the main-shaft segments 7a, 7b.

Figure 5:
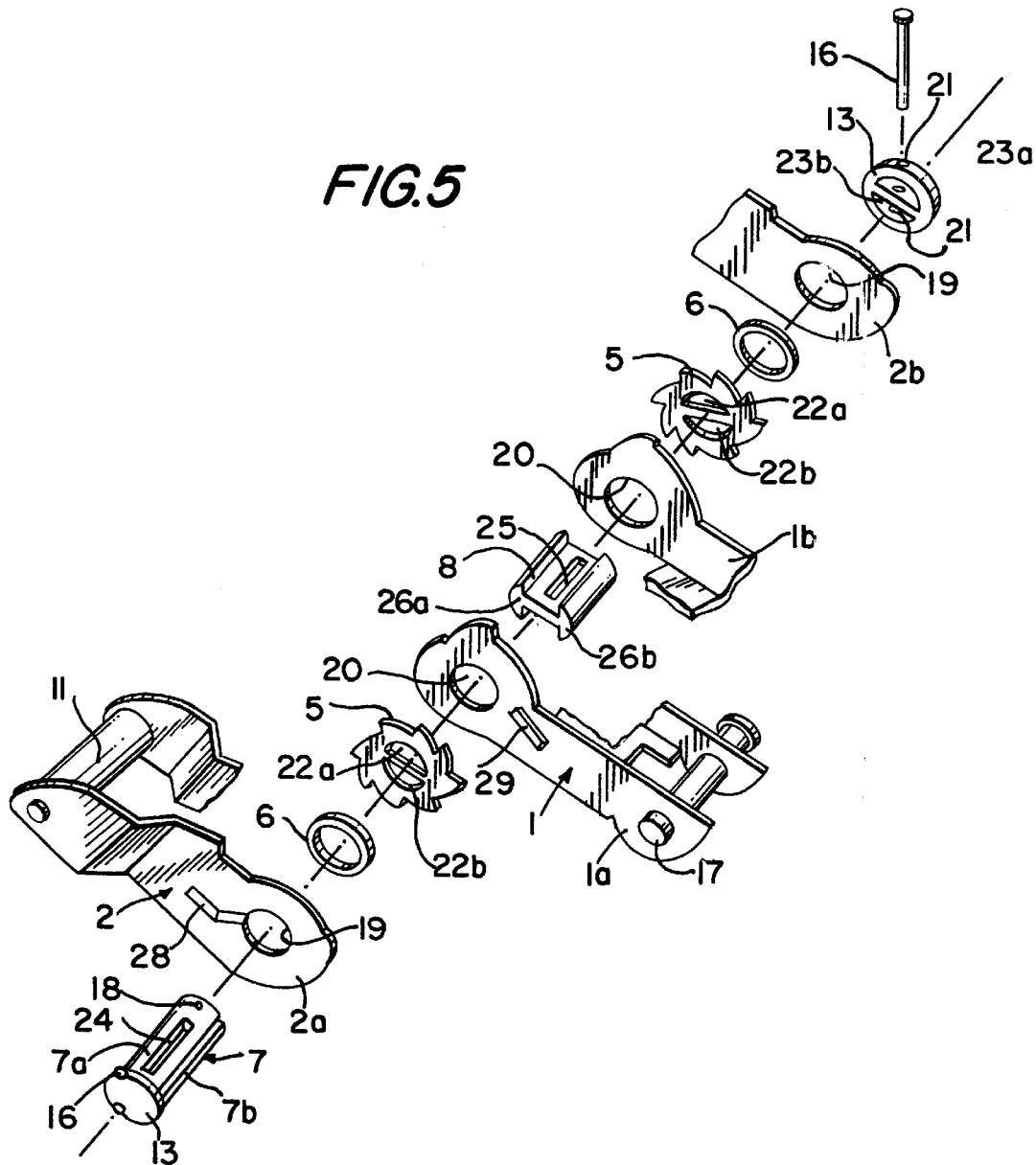
FIG. 5 is a perspective exploded view of the strap winding shaft of the ratchet buckle assembly of the present invention shown in FIG. 1.

As shown in FIG. 5, a pair of diametrically opposed enlarged portions 26a, 26b are formed in opposite end portions of the core plate segment 8 used in the strap winding shaft 7. Each of theses enlarged portions 26a, 26b has its outer surface bulged outward to assume a rounded outer shape, so that a subassembly, which is constructed of the main-shaft segments 7a, 7b and the core plate segment 8, is so designed as to assume a rounded shape in cross section as a whole. These enlarged portions 26a, 26b form a means for preventing the core plate segment 8 from dropping out of the strap winding shaft 7, and also form a means for preventing the main-shaft segments 7a, 7b from being deformed.

Mounted in an insertion manner in a space defined between the ratchet wheel 5 and each of the hand arms 2a, 2b is a spacer ring 6.

In the ratchet buckle assembly of the present invention having the above construction, as described above: the strap winding shaft 7 is constructed of a pair of the main-shaft segments 7a, 7b and the core plate segment 8; and, the strap 27 has the first one 27a of its opposite end portions 27a, 27b inserted into both the first slots 24 (which extends in the radial direction of the main-shaft segments 7a, 7b) and the second slot 25 (which extends in the thickness direction of the core plate segment 8), and is wound on the strap winding shaft 7. Consequently, it is possible to improve the strap winding shaft 7 in its rigidity, and also possible to increase an upper limit of a load (to which the strap 27 is subjected) without any fear of deformation of the strap winding shaft 7.

What is claimed is:

1. In a ratchet buckle assembly for tightening a strap, comprising:
   a pair of ratchet wheels (5);
   a main body (1) provided with a first axial hole in its base-end portion;
   a handle (2) provided with a second axial hole in its base-end portion, the handle being rotatably connected with said main body;
   a strap winding shaft (7) to which each said ratchet wheel (5) is fixedly mounted, said strap winding shaft being inserted in said first and second axial holes of said base-end portions of both said main body (1) and said handle (2);
   a strap having a first one (27a) of its opposite end portions (27a, 27b) wound on said strap winding shaft (7), and the second one (27b) fixed to a strap fixing bar (17) provided in a front-end portion of said main body (1);
   a drive plate (4) slidably mounted in a first guide hole (28) of said handle (2), the drive plate (4) being urged forward toward said ratchet wheels (5) under the influence of a resilient force exerted by a first spring (15);
   a ratchet (3) slidably mounted in a second guide hole (20) of said main body (1), said ratchet (3) being urged forward toward said ratchet wheels (5) under the influence of a resilient force exerted by a second spring (14);
   whereby when said handle (2) is rotated in a predetermined direction, said drive plate (4) is engaged with one of multiple follower surfaces of teeth of said ratchet wheel (5) to rotate said strap winding shaft (7) in its winding direction; and at the same time, said ratchet (3) is permitted to slip away along one of releasing surfaces of said teeth of said ratchet wheel (5); and when said handle (2) is reversed in its rotational direction, said ratchet (3) is engaged with one of said follower surfaces of said teeth of said ratchet wheel (5) to prevent said strap winding shaft (7) from rotating in its reverse direction in a condition in which said drive plate (4) is permitted to slip away along one of said releasing surfaces of said teeth of said ratchet wheel (5);
   the improvement wherein said strap winding shaft (7) is constructed of:
   a pair of main-shaft segments (7a, 7b) each having a semicircular cross section, said main-shaft segments (7a, 7b) being connected with each other at their opposite axial ends; and continuing a pair of first axial slots (24); and
   a core plate segment (8) tightly fitted in a space defined between said main-shaft segments (7a, 7b), and containing a second slot (25), whereby said strap has the first end (27a) of its opposite end portions (27a, 27b) inserted in both said pair of first slots (24) in said main-shaft segments (7a, 7b) and in said second slot (25) of said core plate segment (8), said first slots (24) extending in a radial direction of said main-shaft segments (7a, 7b), said second slot (25) extending in the thickness direction of said core plate segment (8), and said strap (27) is wound on said strap winding shaft (7).

2. A ratchet buckle assembly for tightening a strap, comprising:
   a main body(1) provided with a first axial hole in its base-end portion;
   a handle (2) provided with a second axial hole in its base-end portion, the handle being rotatably connected with said main body;
   a pair of ratchet wheels (5) each having multiple teeth;
   a strap winding shaft (7) to which said ratchet wheels (5) are fixedly mounted, the strap winding shaft being inserted in said first and said second axial holes of said base-end portions of both said main body (1) and said handle (2);
   a strap having a first end portion (27a) wound on said strap winding shaft (7) and a second end potion (27b) fixed to a strap fixing bar (17) provided in a front-end portion of said main body (1);
   a drive plate (4) slidably mounted in a first guide hole (28) of said handle (2), the drive plate being urged forward toward said ratchet wheels (5) under influence of a resilient force exerted by a first spring (15);
   a ratchet (3) slidably mounted in a second guide hole (29) of said main body (1), said ratchet (3) being urged forward toward said ratchet wheel (5) under the influence of a resilient force exerted by a second spring (14);
   said strap winding shaft (7) further comprising:
   a pair of main-shaft segments (7a, 7b) each having a semi-circular cross-section, said main-shaft segments being connected with each other at their opposite axial ends by said ratchet wheels (5) and containing a pair of first axial slots (24); and
   a core plate segment (8) tightly fitted in a space defined between said main-shaft segments (7a, 7b) and containing a second slot (25) wherein said strap has the first end (27a) of its opposite end portions (27a, 27b) inserted in both said pair of first slots (24) provided in said main-shaft segments (7a, 7b) and a second slot(25) in said core plate segment (8), said first slots (24) extending in a radial direction of said main-shaft segments (7a, 7b) said second slot (25) extending in the thickness direction of said core plate segment (8), whereby said strap (27) is inserted through said first slots (24) and said second slot (25) and is wound on said strap winding shaft (7) by intermittent rotation of said handle (2) relative to said main body (1).

3. The ratchet buckle assembly of claim 2, wherein each said ratchet wheel (5) contains a pair of through holes (22a, 22b) each said hole having a semi-circular shape and in which said main shaft segments (7a, 7b) are mounted.

4. The ratchet buckle assembly of claim 2, wherein a pair of axial end caps (13) are each tightly mounted on an end portion of said main shaft segments (7a, 7b) each said end cap (13) having a pair of concave portions (23a, 23b) into which the end portions of said main shaft segments (7a, 7b) are mounted.

5. The ratchet buckle assembly of claim 2, wherein said core plate segment (8) includes a pair of diametrically opposed enlarged portions (25a, 25b) each being bulged outwardly so as to assume a rounded shape.

6. The ratchet buckle assembly of claim 2, wherein a spacer (6) is mounted in a space provided between the ratchet wheel (5) and each of arms (2a, 2b) of said handle (2).

7. A ratchet buckle assembly for tightening a strap, comprising:

a main body (1) provided with a first axial hole located in a base-end portion of the main body;

a handle (2) provided with a second axial hole located in a base-end portion of the handle, the handle being rotatably connected with said main body;

a pair of ratchet wheels (5) each having multiple teeth;

each said ratchet wheel (5) containing a pair of through holes (22a, 22b), each said hole having a semi-circular shape and in which said main shaft segments (7a, 7b) are mounted;

a strap winding shaft (7) to which said ratchet wheels (5) are fixedly mounted, the strap winding shaft being inserted in said first and said second axial holes of said base-end portions of both said main body (1) and said handle (2);

a strap having a first end portion (27a) wound on said strap winding shaft (7) and a second end portion (27b) fixed to a strap fixing bar (17) provided inn a front-end portion of said main body (1);

a drive plate (4) slidably mounted in a first guide hole (28) of said handle (2), the drive plate being urged forward toward said ratchet wheels (5) under influence of a resilient force exerted by a first spring (15);

a ratchet (3) slidable mounted in a second guide hole (20) of said main body (1), said ratchet (3) being urged forward toward said ratchet wheels (5) under the influence of a resilient force exerted by a second spring (14);

said strap winding shaft (7) further comprising: a pair of main-shaft segments (7a, 7b) each having a semicircular cross-section, said main-shaft segments being connected with each other at their opposite axial ends by said ratchet wheels (5); and a core plate segment (8) tightly fitted in a space defined between said main-shaft segments (7a, 7b) each said core plate segment (8) having a pair of diametrically opposed enlarged portions (25a, 25b) each being bulged outwardly so as to assume a rounded shape; wherein said strap has the first end (27a) of its opposite end portions (27a, 27b) inserted in both a pair of first slots (24) provided in said main-shaft segments (7a, 7b) and a second slot (25) in said core plate segment (8), said first slots (24) extending in a radial direction of said main-shaft segments (7a, 7b)said second slot (25) extending in the thickness direction of said core plate segment (8), whereby said strap (27) is inserted through said first slots (24) and said second slot (25) and is wound on said strap winding shaft (7) by intermittent rotation of said handle (2) relative to said main body (1).

* * * * *